Nov. 10, 1953
H. H. KISTNER
2,658,715
VALVE REPLACEMENT UNIT
Filed March 15, 1949
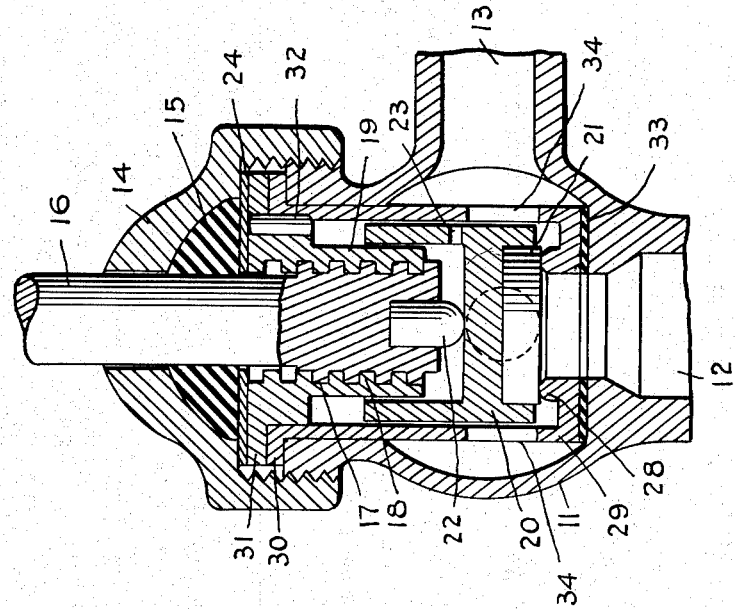
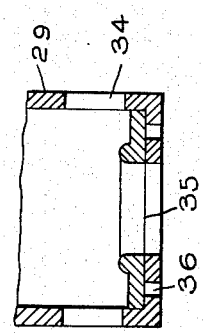
INVENTOR.
HERMAN H. KISTNER
BY
ATTORNEYS.

Patented Nov. 10, 1953

2,658,715

UNITED STATES PATENT OFFICE 2,658,715

VALVE REPLACEMENT UNIT

Herman H. Kistner, Glen Ridge, N. J.

Application March 15, 1949, Serial No. 81,505

3 Claims. (Cl. 251—139)

This invention relates to shut-off valves for liquids and gases generally although it is primarily adapted to spigot valves as used in domestic hot and cold water systems, and is an improvement on the type of valve shown in my Patent No. 2,147,845, dated February 21, 1939.

The invention aims to provide an improved valve stem and screw threaded bushing in combination with a floating valve for use as a replacement unit for the screw stem valves in common use in stop valves today, and to improve the functioning and durability of valve stems, valves and seats generally.

Further aims and objects are to provide for noiseless operation and uniform flow in this general type of valve, to prolong the useful life of the valve before it begins to drip and leak, and to enable the valve and the valve seat either or both to be replaced independently of the other parts of the valve.

For the better disclosure of the invention and what it comprises, reference is made to the following description of illustrative embodiments thereof, as shown in the accompanying drawings, wherein Fig. 1 is a vertical axial section of the preferred form of the invention; and Fig. 2 is a vertical axial section of a portion of a removable valve seat for use with the form of the invention shown in Fig. 1.

In both forms of the invention shown, the valve bodies 10, 11 are of conventional type and are provided with water inlet and outlet passages 12, 13, respectively, and a removable cap 14, enclosing a suitable packing material 15, for the stem 16 of the valve operating means, usually fitted at its upper end with a handle or wheel (not shown) for rotating the valve to open or close it. The stem 16 is provided at its lower end with screw threads 17 which engage in the mating threads 18 of the bushing member 19, the lower end of which is cylindrical and fits loosely within the upper cavity of the flanged or cupped valve member 20, preferably made of brass or bronze, a clearance of about five to ten one thousandths of an inch being left between the inside diameter of the bushing and the outer diameter of the valve member to permit proper seating of the valve member on its seat.

A sealing disc 21, of soft metal, leather, fibre, or other suitable non-corroding material or alloy, is pressed into a shallow cavity in the lower face of the valve member to engage the valve seat when the valve is closed. A Monel metal or other rust and wear resistant thrust pin 22 with a rounded lower end is pressed into an axial bore in the lower end of the stem 16 to bear against the upper face of the valve member 20 to retain it and the sealing disc 21 against the valve seat in closed position of the valve. A small bleeder hole 23 is provided in the upper flange of the valve member to permit it to slide freely on the lower end of the bushing. A steel or bronze washer 24 is provided between the packing 15 and bushing 19 which retains the packing in the cap 14 when the latter is removed, and also retains the valve stem 16 from being unscrewed too far when the members are in place on or in the valve body.

In the form of the invention shown in Fig. 1, a valve seat 28 is formed in a removable cup 29 carried by the bushing 19, a flange 30 surrounding the upper rim of the cup bearing against the top edge of the body 11 between it and the encircling top flange 31 of the bushing against which the under face of the cap 14 and washer 24 bear to hold these parts in place. A dowel pin 32 is provided for preventing the cup 29 from turning on the bushing, and a similar pin may be provided for retaining both cup 29 and bushing 19 against rotation in the valve body 11. A sealing washer 33 is provided for preventing leakage between the lower face of the cup 29 and the body 11. Four or more openings 34 are made in the lower sidewall of the cup to permit the fluid to flow freely into the outlet 12 after passing through the valve seat.

In the modification shown in Fig. 2, the cup 29 is provided with a separable seat member 35, which can be removed by inserting a properly shaped tool through the openings 36. Bronze or other alloy suitable for valve seats, or hard plastic material, may be used for the valve seat and replaced from time to time with the valve disc 21, the materials of the seat and disc being selected from those which experience has taught have the best wearing qualities for holding the particular liquids being handled.

I claim the following as my invention:

1. The combination with a valve body having axially alined inlet and valve operating openings and a transverse outlet opening and a cap covering the valve operating opening provided with a central opening for a valve stem, of a replaceable valve seat comprising a cylindrical cup having an opening in its bottom and an outer flange around its top, said flange contacting a circular seat on the side wall of said valve body, a packing member between the bottom of said cup and the inner wall of said valve body surrounding said inlet opening, an internally threaded bushing having an outer flange overlying the outer flange of said cup and a central shell spaced within said cup, means for securing said cap to said valve body with said outer flanges of the cup and bushing between it and the seat on said body to retain them in axially alined position, a cylindrical valve member fitting within said cup and having a circular recess in its bottom to receive a valve face and a circular recess in its top to receive the central shell of said bushing, and an externally threaded valve stem extending through said bushing having its outer end projecting through said cap and its inner end centrally contacting said valve member.

2. The combination with a valve body having axially alined inlet and valve operating openings and a transverse outlet opening and a cap covering the valve operating opening provided with a central opening for a valve stem, of a replaceable valve seat comprising a cylindrical cup having an opening in its bottom and an outer flange around its top, said flange contacting a circular seat on the side wall of said valve body, an internally threaded bushing having an outer flange overlying the outer flange of said cup and a central shell spaced within said cup, means for securing said cap to said valve body with said outer flanges of the cup and bushing between it and the seat on said body to retain them in axially alined position, means for preventing relative rotation of said cup and bushing, a cylindrical valve member fitting within said cup and having a circular recess in its bottom to receive a valve face and a circular recess in its top to receive the central shell of said bushing, and an externally threaded valve stem extending through said bushing having its outer end projecting through said cap and its inner end centrally contacting said valve member.

3. The combination with a valve body having axially alined inlet and valve operating openings and a transverse outlet opening and a cap covering the valve operating opening provided with a central opening for a valve stem, of a replaceable valve seat comprising a cylindrical cup having an opening in its bottom and an outer flange around its top, said flange contacting a circular seat on the side wall of said valve body, an opening in the side wall of said cup communicating with said outlet opening, a removable valve seat in said cup surrounding its bottom opening, an internally threaded bushing having an outer flange overlying the outer flange of said cup and a central shell spaced within said cup, means for securing said cap to said valve body with said outer flanges of the cup and bushing between it and the seat on said body to retain them in axially alined position, a cylindrical valve member fitting within said cup and having a circular recess in its bottom to receive a valve face and a circular recess in its top to receive the central shell of said bushing, and an externally threaded valve stem extending through said bushing having its outer end projecting through said cap and its inner end centrally contacting said valve member.

HERMAN H. KISTNER.

References Cited in the file of this patent

UNITED STATES PATENTS

| Number | Name | Date |
| --- | --- | --- |
| 49,894 | Krull | Sept. 12, 1865 |
| 103,872 | Greene | June 7, 1870 |
| 963,152 | Jones | July 5, 1910 |
| 1,101,933 | Hough | June 3, 1914 |
| 1,420,664 | Maxwell | June 27, 1922 |
| 2,147,845 | Kistner | Feb. 21, 1939 |